United States Patent
Takahara

(10) Patent No.: US 9,255,544 B2
(45) Date of Patent: Feb. 9, 2016

(54) PISTON TYPE INTERNAL COMBUSTION ENGINE

(71) Applicant: Nobuya Takahara, Hyogo (JP)

(72) Inventor: Nobuya Takahara, Hyogo (JP)

( * ) Notice: Subject to any disclaimer, the term of this patent is extended or adjusted under 35 U.S.C. 154(b) by 0 days.

(21) Appl. No.: 14/556,278

(22) Filed: Dec. 1, 2014

(65) Prior Publication Data

US 2015/0240742 A1 Aug. 27, 2015

(30) Foreign Application Priority Data

Feb. 21, 2014 (JP) .................................. 2014-031357

(51) Int. Cl.

| F02B 75/08 | (2006.01) |
|---|---|
| F02F 1/00 | (2006.01) |
| F02F 1/18 | (2006.01) |
| F01B 7/18 | (2006.01) |

(52) U.S. Cl.
CPC . F02F 1/004 (2013.01); F01B 7/18 (2013.01); F02F 1/18 (2013.01); F05C 2251/048 (2013.01); Y02T 10/125 (2013.01)

(58) Field of Classification Search
CPC ...... Y10T 29/49272; F16J 10/04; F02F 1/004
USPC ...................... 123/668–669, 193.2
See application file for complete search history.

(56) References Cited

U.S. PATENT DOCUMENTS

| 1,820,878 | A | * | 8/1931 | Wyckoff | 123/668 |
| 1,835,971 | A | * | 12/1931 | Schattanek | 123/25 C |
| 1,904,070 | A | * | 4/1933 | Morgan | 60/620 |
| 4,254,621 | A | * | 3/1981 | Nagumo | 60/282 |
| 4,466,399 | A | * | 8/1984 | Hinz et al. | 123/193.4 |
| 4,524,498 | A | * | 6/1985 | Hartsock | 29/888.011 |
| 4,532,896 | A | * | 8/1985 | Nakahara et al. | 123/193.5 |
| 4,774,926 | A | * | 10/1988 | Adams | 123/668 |
| 4,921,734 | A | * | 5/1990 | Thorpe et al. | 428/34.4 |
| 5,033,427 | A | * | 7/1991 | Kawamura et al. | 123/193.3 |
| 5,080,081 | A | * | 1/1992 | Kawamura | 123/559.1 |
| 5,738,061 | A | * | 4/1998 | Kawamura | 123/193.1 |

FOREIGN PATENT DOCUMENTS

JP 06317216 A * 11/1994 ............... F02F 1/00

* cited by examiner

*Primary Examiner* — Hung Q Nguyen
(74) *Attorney, Agent, or Firm* — Wenderoth, Lind & Ponack, L.L.P.

(57) ABSTRACT

An internal combustion engine includes a cylinder of which the interior is divided into two in the longitudinal direction. The lower chamber serves as a mechanical driving portion in which the piston is reciprocated. The upper chamber serves as a power portion in which combustion gas is drawn in, compressed, burned and exhausted. A cylindrical portion with a lid which moves into the power portion is continuously provided on top of the piston. A gap is defined between the cylindrical portion and the inner peripheral surface of the power portion of the cylinder. The inner peripheral surface of the power portion is defined by a heat shield tube fitted in the cylinder. A heat insulating tube is provided on the outer periphery of the heat shield tube.

1 Claim, 5 Drawing Sheets

PISTON TYPE INTERNAL COMBUSTION ENGINE

This application is based on and claims priority under 35 U.S.C. sctn. 119 with respect to Japanese Patent Application No. 2014-31357 filed on Feb. 21, 2014, the entire content of which is incorporated herein by reference.

FIELD OF THE INVENTION

This invention relates to a piston type internal combustion engine having high thermal efficiency.

BACKGROUND OF THE INVENTION

A typical piston type internal combustion engine (reciprocating engine) is described first. FIGS. 4A to 4C show a four-cycle internal combustion engine, which typically includes a cylinder 1 (defining a cylinder bore), a piston 2 slidably mounted in the cylinder bore of the cylinder 1, and a connecting rod 4 through which the piston 2 is connected to a crankshaft 3. This engine further includes intake and exhaust valves 5, and a spark plug 6.

This internal combustion engine is configured such that when the piston 2 moves down from the uppermost position (FIG. 4A) to an intermediate position (FIG. 4B) and then to the lowermost position (FIG. 4C), a fuel-air mixture is introduced (sucked) into the cylinder 1 through one of valves 5, and when the piston 2 rises from the lowermost position to an intermediate position (shown by chain line in FIG. 4B) to the uppermost position, the fuel-air mixture is compressed.

With the fuel-air mixture compressed, the spark plug 6 is ignited to cause combustion of the fuel-air mixture, thus moving down the piston 2 to the lowermost position (see FIGS. 4A to 4B to 4C).

When the piston rises again from the lowermost position, burned gas is exhausted from the cylinder 1 through the other of the valves 5 (see FIGS. 4C to 4B (chain line) to 4A). Then, the suction stroke begins again. Due to the four strokes (suction, compression, combustion/expansion and exhaustion), the piston 2 rotates the crankshaft 3 through the connecting rod 4. The rotating crankshaft 3 in turn rotates a rotary shaft 7. If the engine is an automotive engine, the rotary shaft 7 is a drive shaft for driving wheels.

In the combustion engine, while fuel-air mixture is sucked into the cylinder, compressed, burned and exhausted, with the piston 2 reciprocating in the cylinder 1 while kept in contact with the inner wall of the cylinder 1, the inner wall of the cylinder 1 is directly heated by the high-pressure, high-temperature burned gas. In order to prevent damage to the piston 2 and the cylinder 1 due to friction between the outer peripheral surface of the piston 2 and inner wall of the cylinder 1, the piston 2 carries a piston ring 9 which is brought into sliding contact with the inner wall of the cylinder 1. The cylinder 1 is formed with a cooling passage 8 as shown in FIG. 4A to 4C through which water is passed to cool the cylinder 1 and the piston 2 (remove heat from the cylinder and the piston).

By cooling the cylinder 1, thermal energy is lost during the combustion/expansion stroke, so that thermal efficiency deteriorates. For higher thermal efficiency, the portion of the inner wall of the cylinder which is brought into contact with the high-pressure, high-temperature burned gas, which generates power, should be kept at high temperature. On the other hand, the portion of the inner wall of the cylinder that is brought into sliding contact with the piston has to be kept at low temperature for lubrication. However, in the conventional arrangement, since the cylinder is a monolithic member, it is necessary to cool the entire cylinder 1, so that thermal efficiency is low.

SUMMARY OF THE INVENTION

An object of the present invention is to move the piston smoothly in a high-pressure, high-temperature gas, and to improve thermal efficiency by reducing thermal loss due to cooling of the heat dissipating portion of the cylinder, which accounts for most of the heat dissipating portion.

In order to achieve this object, according to the present invention, the cylinder is divided into a combustion chamber and a piston driving portion.

That is, the cylinder according to the present invention has an upper portion which is longer than the upper portion of a conventional cylinder, and a power portion in which section, compression, combustion/expansion, and exhaustion strokes are performed is defined at the upper portion of the cylinder. The lower portion is a mechanical driving portion of a conventional structure, where the piston is reciprocated, and is integral with the upper portion. The piston has a pressure-resistant and heat-resistant cylindrical portion at its upper portion which is configured to reciprocate along the inner surface of the power portion of the cylinder.

With this arrangement, it is not necessary to arrange the piston so as to move into the power portion, which is the conventional combustion chamber, so that it is necessary to cool only the driving portion of the piston. Thus, when the driving portion is cooled, the combustion chamber (power portion) is less likely cooled, which maximizes heat efficiency during burning in the internal combustion engine.

Heat efficiency of the piston type internal combustion engine according to the present invention is high compared to conventional engines of this type. The engine according to the present invention is therefore superior in fuel economy, generates less $CO_2$, is low in pump loss of the intake and exhaust valves, and low in cooling power, and makes it possible to reduce the size of the cooling device, compared to a conventional internal combustion engine of the same output.

DETAILED DESCRIPTION OF PREFERRED EMBODIMENTS

Figure 1A:
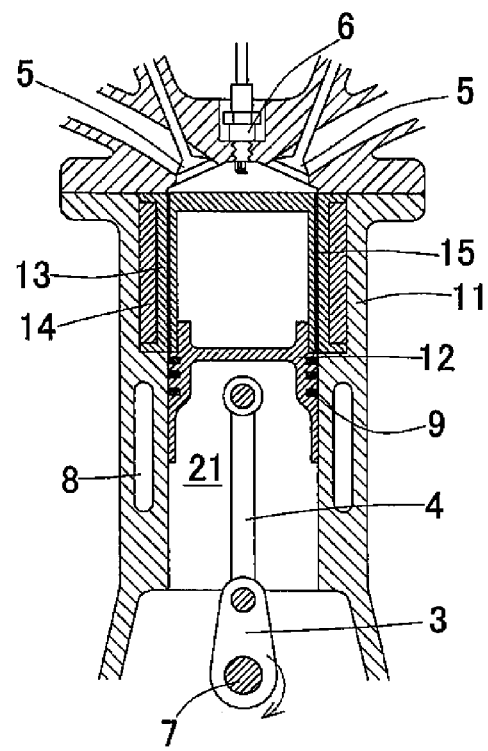
FIG. 1A is a sectional view of an internal combustion engine embodying the present invention.

As an embodiment of this invention, the piston and the cylinder are extended from the top portion of the conventional structure by the stroke of the piston to define a combustion chamber as a power portion, while the driving mechanism of the conventional cylinder and piston serves as a pure mechanical driving device (driving portion) for driving the piston substantially at normal temperature without directly receiving combustion gas, with these two portions integrated with each other.

With this arrangement, the engine is longer by the length of the extended portion of the cylinder. However, since the output increases corresponding to the increased efficiency, if the output is the same as the conventional arrangement, the volume of the entire engine is the same or smaller. It is possible to reduce the number of multiple cylinders.

In a specific arrangement, in an internal combustion engine comprising a cylinder, a piston slidably mounted in the cylinder, a connecting rod through which the piston is coupled to a crankshaft, and intake and exhaust valves, the cylinder has an interior space which is divided into a lower driving portion in which the piston is mechanically driven, and an upper power portion in which combustion gas is sucked, compressed, burned and expanded, and exhausted, the engine further comprises a cylindrical portion having a lid portion and mounted on the top portion of the piston so as to extend into the power portion with the lid portion facing the top portion of the cylinder, and a gap is defined between the cylindrical portion and the inner peripheral surface of the power portion of the cylinder.

The length of the cylinder and the boundary position (divided position) between the power portion and the driving portion are suitably determined, e.g. by experiments, taking into consideration the combustion efficiency. For example, a combustion chamber as the power portion is defined by extending the piston and the cylinder by the length equal to the stroke of the piston from the top of the conventional arrangement. By extending the combustion chamber by the length equal to the stroke of the piston, it is possible to ensure kinetic energy obtained in a conventional arrangement by obtaining the same combustion/expansion stroke as in the conventional arrangement.

Since the portion of the inner surface of the cylinder which serves as the inner peripheral surface of the power portion as the combustion chamber is subjected to a high pressure and a high temperature, this portion is preferably formed by a pressure- and heat-resistant cylinder (hereinafter referred to as the "heat shield tube"), with a heat insulating cylinder (hereinafter referred to as the "heat insulating tube") provided on the outer periphery of the heat shield tube. If the heat shield tube and the cylindrical portion, at the top of the cylinder, were cooled, thermal efficiency will decrease. Thus, it is not preferable to provide a cooling means such as the cooling passage 8. Thus, the cylindrical portion and the heat shield tube are made of a material which is higher in heat resistance than the material forming the cylinder and the piston so as to withstand high temperature. For smooth reciprocating motion, the heat shield tube is fitted in the cylinder (cylinder bore) such that its center axis coincides with the center axis of the driving portion.

The cylinder and the piston can be made of a material which is as heat-resistant as or less heat-resistant than conventional cylinders and pistons.

The cylindrical portion, which is provided on the top portion of the piston and extends into the combustion chamber, has such a diameter that a small gap is defined between the cylindrical portion and the cylinder which allows the cylindrical portion to move without contacting the cylinder and allows smooth suction, compression, combustion/expansion, and exhaustion. Leakage of combustion gas into the gap is stopped by the lower driving portion, which corresponds to the conventional piston portion. Since the contact area between the upper portion of the piston and the combustion gas is equal to the size of the gap, such a contact area is extremely small compared to the conventional arrangement. This minimizes the temperature rise of the piston, so that it is possible to minimize the cooling function.

The portions of the piston and the cylinder that are not extended are of a conventional structure, and form a cylinder-heat-insulated, piston type internal combustion engine together with valves and other accessories.

EXAMPLES

FIGS. 1A to 1C and 2 show an example of the present invention. Elements of these figures corresponding to those shown in FIGS. 4A to 4C are denoted by identical numerals. This example is described with reference to FIG. 1C, in which the piston 12 is at the lowermost position, in comparison with FIG. 4C, which shows a conventional engine. The piston 12 of the example has a length $L_1$ which is larger than the length $L_1'$ of the conventional piston 2 by the stroke length $L_2$ (=S) of the piston 2 ($L_1=L_1'+S$). The cylinder 11 is correspondingly longer than the cylinder 1 by a length L3 (=S). The piston 12 has a longitudinally extended cylindrical portion 15 having such a diameter that a gap 12a is defined between the cylindrical portion 15 and the inner wall 11a of the cylinder 11. The size of the gap 12a is determined, e.g. by experiments, such that the cylindrical portion 15, at the top of the piston 12, does not come into sliding contact with the inner surface of the cylinder 11 and is not damaged due to friction with the inner surface of the heat shield tube 13, and so as not to interfere with the combustion/expansion stroke. As shown in the drawings (see especially FIGS. 1A and 3A), the gap 12a defined between the cylindrical portion 15 and the inner peripheral surface of the upper power portion 20 of the cylinder 11 is wider than any gap between the piston 12 and the inner peripheral surface of the lower driving portion 21 of the cylinder 11.

The cylinder 11 and the piston 12 may be formed of a conventionally used material such as an aluminum alloy or ferrum casting ductile (FCD), or may be formed of any other material. On the other hand, since the cylindrical portion 15 moves into the combustion chamber (power chamber 20), the cylindrical portion 15 should be formed of a material having a pressure resistance and a heat resistance that are equal to or higher than those of conventional pistons, such materials including heat-resistant steel such as Cr—Ni steel and heat-resistant alloys. The cylindrical portion 15 may be fixedly mounted to the upper portion of the piston 12 by fitting them together. Also, the cylindrical portion 15 may be fixedly mounted to the piston 12 by any other means such as by a pin 16 shown by chain line in FIG. 1C.

A heat shield tube 13 and a heat insulating tube 14 are fixedly fitted in the inner surface of the upper extended portion of the cylinder 11 which is lacking in conventional cylinders. The length $L_4$ of the heat shield tube 13 may be equal to the piston stroke S (=$L_3$), but is preferably slightly longer than the piston stroke ($L_4>L_3$). The inner surface 13a of the heat shield tube 13 has a diameter equal to the diameter of the inner surface 11a of the lower portion of the cylinder 11, along which the piston 12 slides. With the heat insulating tube 14 mounted on the outer peripheral surface of the heat shield tube 13, the heat shield tube 13 is mounted in the upper portion of the cylinder 11.

The heat shield tube 13 is formed of e.g. the same heat-resistant steel or heat-resistant alloy forming the cylindrical portion 15, while the heat insulating tube 14 is formed of a ceramic material such as silicon nitride or a ceramic material comprising alumina nanoparticles, which are heat-resistant and low in heat conductivity.

Figure 1B:
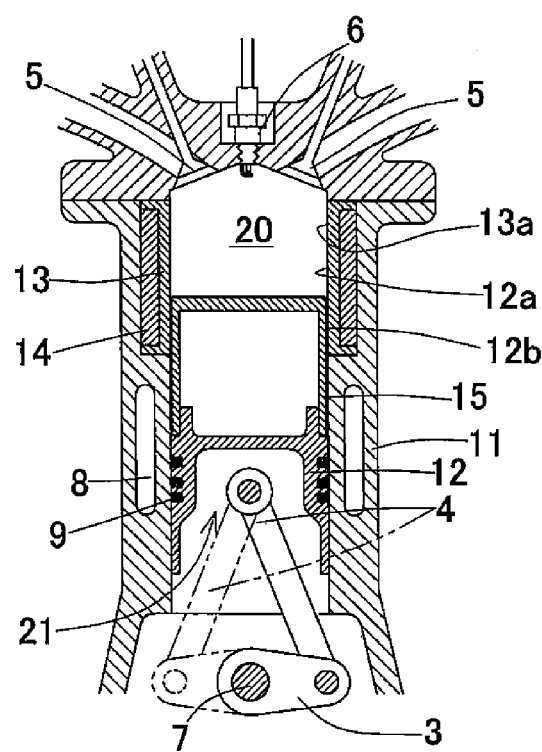
FIG. 1B is a similar sectional view of the engine of FIG. 1A, showing a different operational state.
Figure 1C:
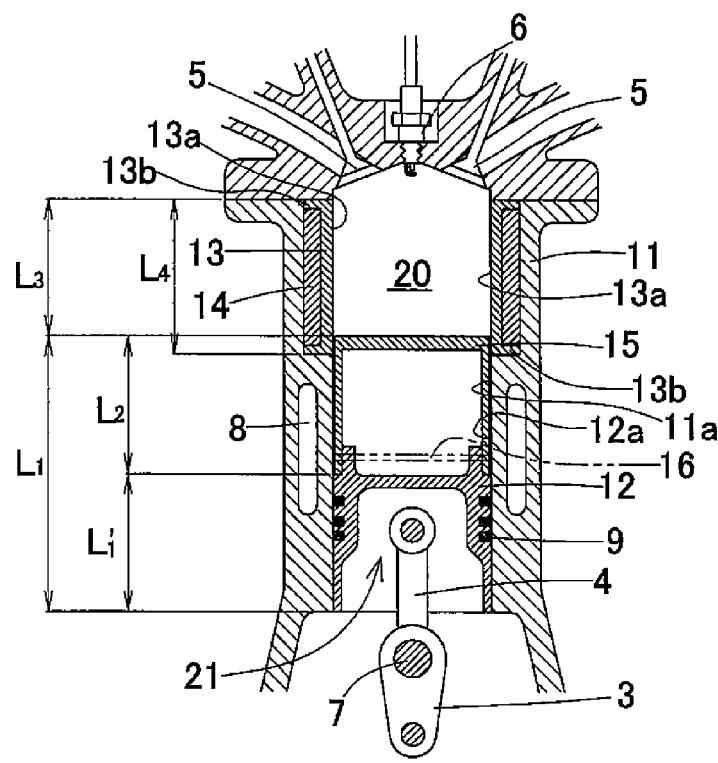
FIG. 1C is a similar sectional view of the engine of FIG. 1A, showing a still different operational state.
Figure 2:
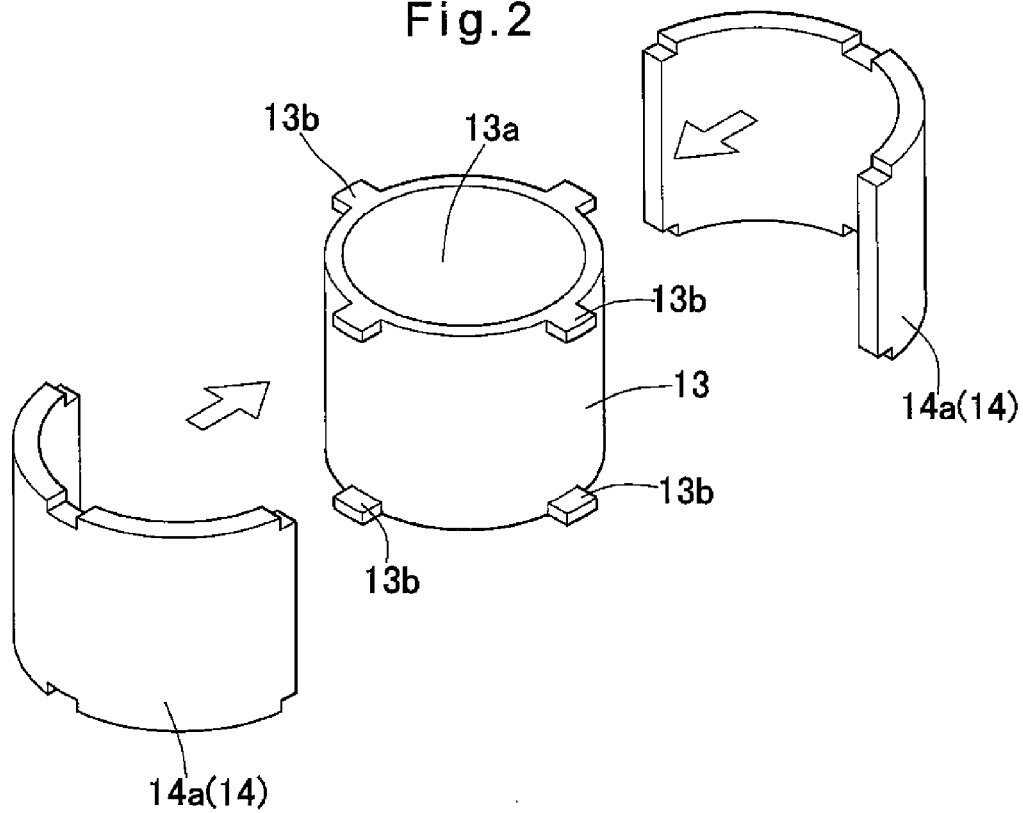
FIG. 2 is an exploded perspective view of a portion of the embodiment of FIG. 1A.

Referring to FIGS. 1C and 2, the heat shield tube 13 has protrusions 13b which are used to arrange the heat shield tube 13 such that its center axis coincides with the center axis of the inner surface 11a of the cylinder 11. With this arrangement, since the contact area between the protrusions 13b and the cylinder 11 is small, it is possible to minimize heat loss due to heat conduction to the cylinder 11. As shown in FIG. 2, the heat insulating tube 14 comprises two separate half members 14a, 14a so that the heat insulating tube 14 can be easily mounted to the heat shield tube 13.

The engine of this example operates in the same manner as conventional engines. In particular, when the piston 12 moves down from the highest position shown in FIG. 1A to the position shown in FIG. 1B and then to the lowest position shown in FIG. 1C (FIG. 1A→FIG. 1B→FIG. 1C), a fuel-air mixture is drawn into the cylinder 1 through one of the valves 5. When the piston 12 subsequently rises from the lowest position to the highest position (FIG. 1C→FIG. 1B (chain line)→FIG. 1A), the fuel-air mixture is compressed.

With the fuel-air mixture compressed, when the spark plug 6 is ignited, the compressed fuel-air mixture burns (explodes) and is expanded, so that the piston 12 is moved down to the lowest position (FIG. 1A→FIG. 1B→FIG. 1C).

When the piston 12 subsequently rises from the lowest position, burned gas is exhausted from the cylinder 1 through the other valve 5 (FIG. 1C→FIG. 1B (chain line)→FIG. 1A). Thereafter, the above four strokes, i.e. suction, compression, combustion/expansion and exhaustion, are repeated. The up-and-down strokes of the piston 12 are transmitted to the crankshaft 3 through the connecting rod 4 to rotate the crankshaft 3 and thus the rotary shaft 7.

During these strokes, the piston 12 never moves into a power portion 20 as the combustion chamber, in any of the positions shown in FIGS. 1A to 1C, but remains in a conventional driving portion 21 which is defined under the power portion 20. Also, since the air layer in the cylindrical portion 15 insulates heat, in the driving portion 21, the piston mechanically moves at substantially a normal temperature because heat is not directly received.

This eliminates the necessity to pass a large amount of cooling medium such as water through the cooling passage 8, which in turn makes it possible to reduce the size of the cooling passage 8 (compare FIG. 1A with FIG. 4A). This also minimizes the influence of cooling on the power portion 20. This means that the temperature of the power portion 20 is less likely to drop, and thus the power portion 20 is high in heat efficiency.

Figure 3A:
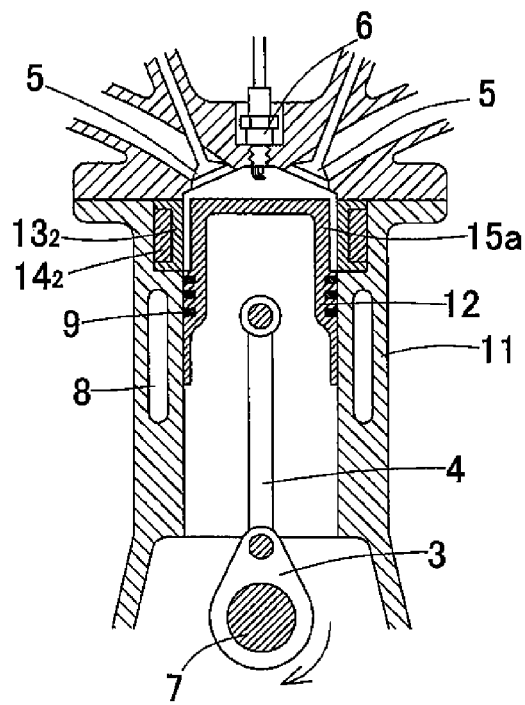
FIG. 3A is sectional view of an internal combustion engine according to another embodiment of the present invention, showing an operational state thereof.
Figure 3B:
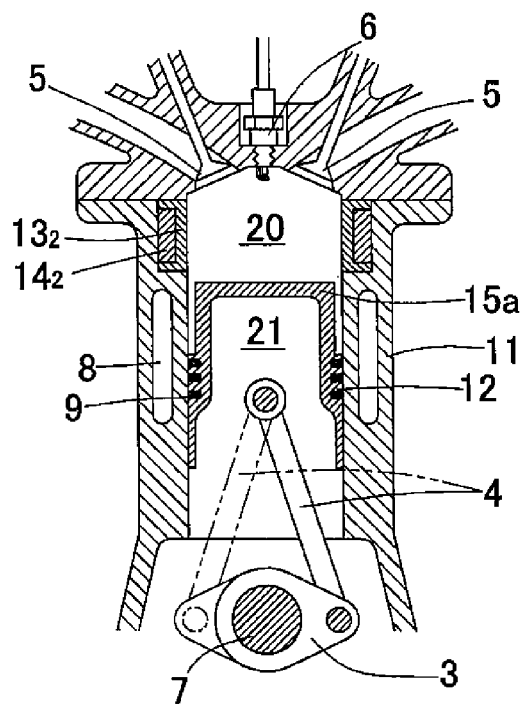
FIG. 3B is a similar sectional view of the engine of FIG. 3A, showing a different operational state.
Figure 3C:
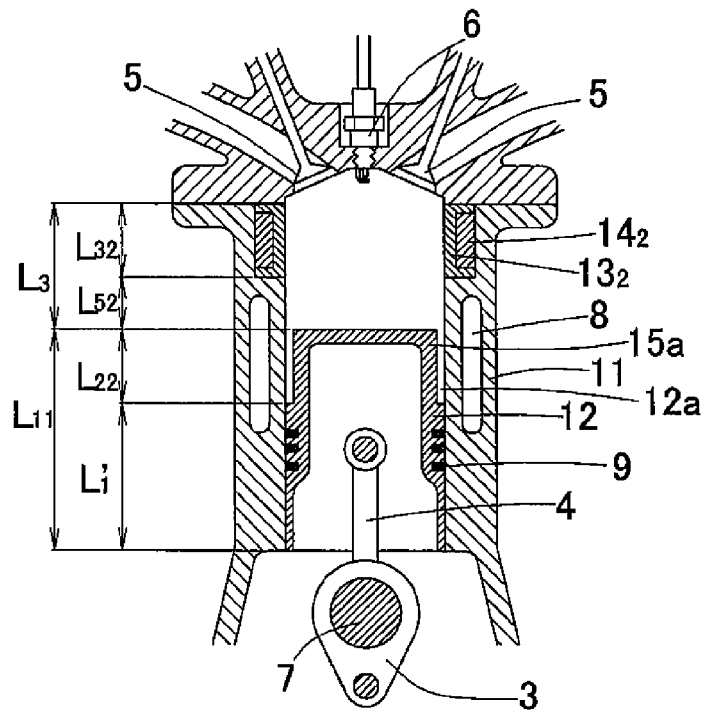
FIG. 3C is a similar sectional view of the engine of FIG. 3A, showing a still different operating state.
Figure 4A:
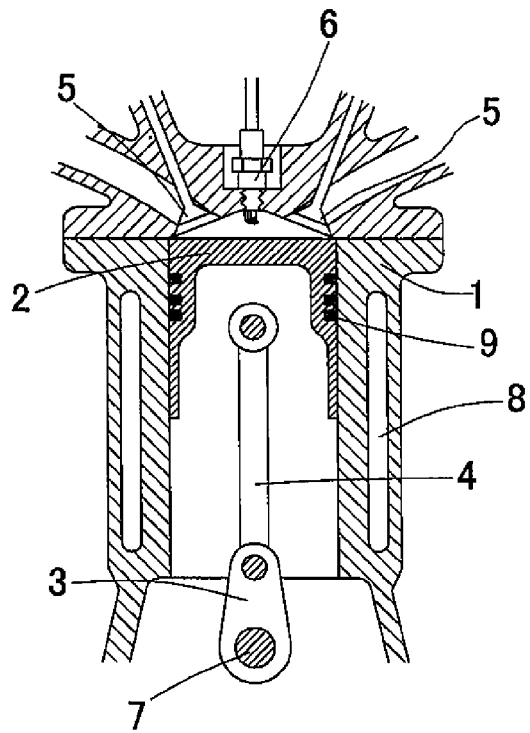
FIG. 4A is a sectional view of a conventional internal combustion engine.
Figure 4B:
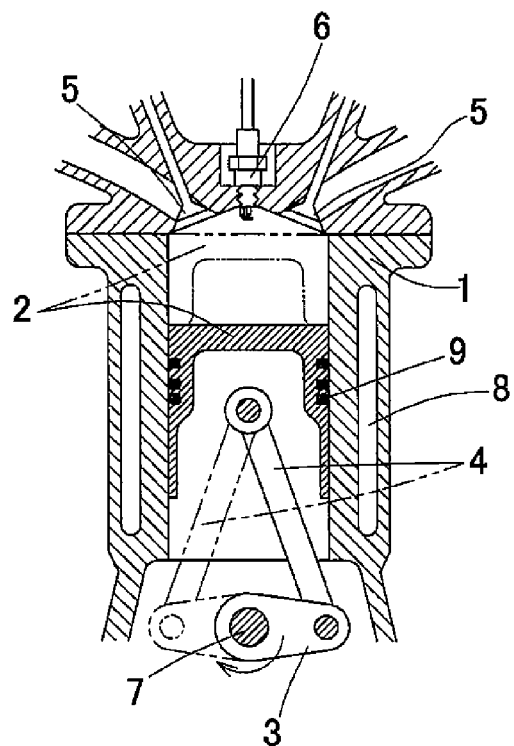
FIG. 4B is a similar sectional view of the engine of FIG. 4A, showing a different operational state.
Figure 4C:
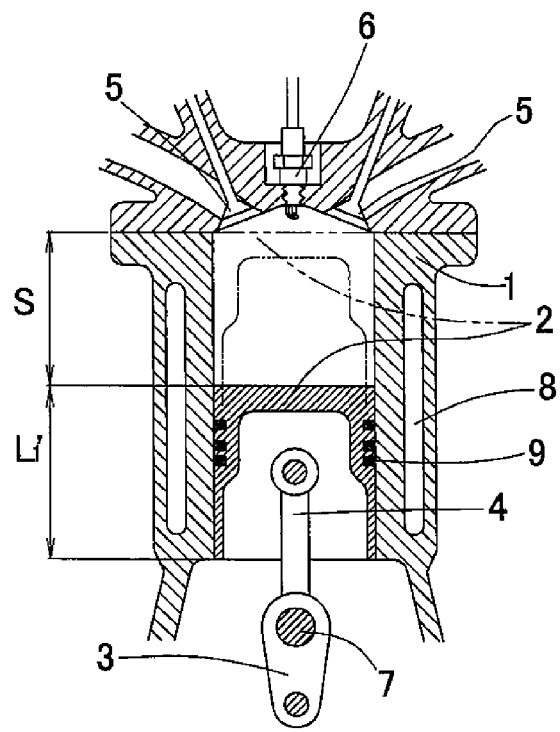
FIG. 4C is a similar sectional view of the engine of FIG. 4A, showing a still different operational state.

FIGS. 3A to 3C show another example. The internal combustion engine of this example is significantly small in size. In particular, the cylindrical portion 15a at the upper portion of the piston 12 is short in length, so that the heat shield tube $13_2$ and the heat insulating tube $14_2$ are correspondingly short in length. The power portion 20 is thus small in size (short in tube length).

Therefore, in this example, the total length $L_{11}$ of the piston 12 is equal to the sum of the total length $L_1'$ of a conventional piston and the length $L_{22}$ of the extended portion which is shorter than the stroke length S ($<L_2$). The heat shield tube $13_2$ and the heat insulating tube $14_2$ are also short. In particular, the length $L_{32}$ of the heat shield tube $13_2$ is equal to the length $L_{22}$ of the extended portion of the piston 12 (see FIG. 3C).

The cylindrical extended portion 15a, which has a lid, is integral with the piston 12, but may be a separate member from the piston as in the case with the first example.

As with the first example, in this example too, when the piston 12 moves down from the highest position to the lowest position as shown in FIGS. 3A to 3B and then to 3C, a fuel-air mixture is drawn into the cylinder 1, and when the piston 12 subsequently rises from the lowest position to the highest position as shown in FIGS. 3C to 3B (chain line) and then to FIG. 3A, the fuel-air mixture is compressed.

With the fuel-air mixture compressed, when the spark plug 6 is ignited, the compressed fuel-air mixture burns (explodes) and is expanded, so that the piston 12 is moved down to the lowest position as shown in FIG. 3A to FIG. 3B and then to FIG. 3C. When the piston 12 subsequently rises from the lowest position, burned gas is exhausted (FIG. 3C→FIG. 3B (chain line)→FIG. 3A). The up-and-down strokes of the piston 12 are transmitted to the crankshaft 3 through the connecting rod 4 to rotate the crankshaft 3 and thus the rotary shaft 7.

During these strokes, the piston 12 never moves into the power portion 20 as the combustion chamber, in any of the positions shown in FIGS. 3A to 3C, but remains in a conventional driving portion 21 which is defined under the power portion 20. In the driving portion, the piston mechanically moves at substantially a normal temperature because heat is not directly received.

This makes it possible to reduce the size of the cooling passage 8. This also minimizes the influence of cooling on the power portion 20, so that the power portion 20 is high in heat efficiency.

In this example, combustion gas in the combustion chamber (power portion) 20 is brought into contact with the portion of the inner surface of the cylinder 11 extending the length $L_{52}$, where there is not the heat shield tube $13_2$, until the piston 12 reaches the bottom end of the stroke S ($=L_3$), so that the gas heat energy is partially dissipated into the cylinder 11, causing heat loss. In this state, however, since combustion gas is being expanded, and the pressure and temperature are decreasing, heat loss is low compared to the prior art shown in FIGS. 4A to 4C.

The engine of this example is lower in total height than the engine of the first example, shown in FIG. 1A, and thus smaller in size.

If there is a concern over insufficient suction due to high temperature of the cylinder 11, a supercharger is preferably provided to smoothly feed air into the cylinder 11.

Needless to say, the present invention is applicable to a diesel engine, which has no spark plug 6. While fuel may be injected by port injection or cylinder injection, cylinder injection is preferable.

What is claimed is:

1. A piston type internal combustion engine comprising a cylinder, a piston slidably mounted in the cylinder, a connecting rod through which the piston is coupled to a crankshaft, and intake and exhaust valves,
    wherein the cylinder has an interior space which is divided into a lower driving portion in which the piston is mechanically driven, and an upper power portion in which combustion gas is sucked, compressed, burned and expanded, and exhausted,
    wherein the engine further comprises a cylindrical portion having a lid portion and mounted on a top portion of the piston so as to extend into the upper power portion with the lid portion facing a top portion of the cylinder,
    wherein the cylindrical portion fits within an inner peripheral surface of the upper power portion of the cylinder with a gap defined between the cylindrical portion and the inner peripheral surface of the upper power portion of the cylinder, wherein the piston fits within an inner peripheral surface of the lower driving portion of the cylinder, wherein the gap defined between the cylindrical portion and the inner peripheral surface of the upper power portion of the cylinder is wider than any gap between the piston and the inner peripheral surface of the lower driving portion of the cylinder, wherein the inner peripheral surface of the upper power portion is formed by a heat shield tube fitted in the cylinder, and wherein a heat insulating tube is provided on an outer periphery of the heat shield tube, and wherein the heat shield tube is formed of heat-resistant steel or heat-resistant alloy, and the heat insulating tube is formed of a ceramic material.

* * * * *